J. LUSTER.
LIFT-PUMP.

No. 192,924. Patented July 10, 1877.

Witnesses:
Chas. F. Weisner.
J. W. Herthel.

Inventor:
John Luster
per Herthel & Co
Attys

UNITED STATES PATENT OFFICE.

JOHN LUSTER, OF EAST JOPLIN, MISSOURI.

IMPROVEMENT IN LIFT-PUMPS.

Specification forming part of Letters Patent No. 192,924, dated July 10, 1877; application filed November 28, 1876.

*To all whom it may concern:*

Be it known that I, JOHN LUSTER, of East Joplin, Jasper county, and State of Missouri, have invented an Improved Lift-Pump, of which the following is a specification:

This invention more especially relates to that class of pumps used for mining purposes, sinking shafts, &c.

This invention relates to the improved parts hereinafter pointed out in the claims.

Figure 1:
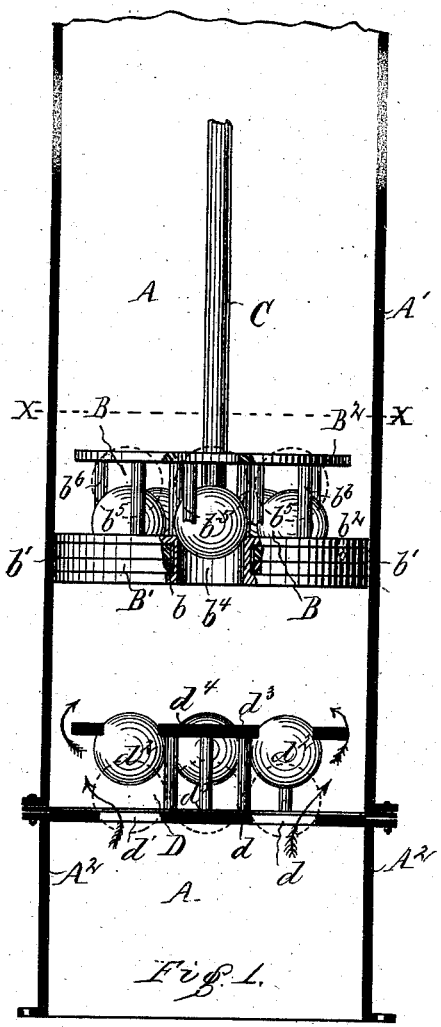
Figure 2:
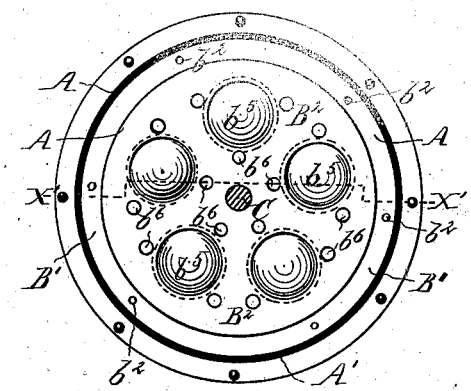
Figure 3:
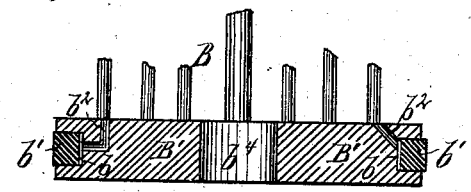

Of the drawings, Figure 1 is a vertical section of a pump with my improved clack and plunger applied. Fig. 2 is a top plan of plunger, showing top openings, &c. Fig. 3 is a detail view, showing the rings and their mode of operation.

A is the pump-barrel. This I divide into an upper section, $A^1$, and a lower section, $A^2$. Within this upper section $A^1$ a plunger, B, operates. This plunger B is of the constructive design shown in Figs. 1 and 2. The bottom part of the plunger I construct so that by means of the expansion of its outer rings a water-tight joint is always had with the interior of the pump-barrel. Hence, the bottom of said plunger consists of the annular disk $B^1$, of wood or metal, formed to have an annular groove or recess, $b$. (See Fig. 3.)

$b^1$ are one or more rings of wood, metal, or rubber, fitted to be retained within the groove $b$ aforesaid. To expand these rings $b^1$, or cause same to form a tight joint with the side of the barrel, I provide the bottom disk of the plunger with small holes $b^2$, that lead to the inner face of said rings. The water or fluid passes into the holes $b^2$, and is thus brought to act by pressure between the rings $b^1$ and the side of their groove, and necessarily causes said rings to expand close against the side of the pump-barrel. In this manner the rings perform the function of packing, maintaining during the operation the needed tight joint.

For the better insertion of the rings in their grooved seat, they can be made in halves, corresponding to each other.

The bottom disk of plunger has one or more holes or water-entrances at $b^4$. (See Fig. 1.) These holes are controlled by balls $b^5$, (see Fig. 1,) which can be of any suitable material, rubber being preferred. $B^2$ is the top disk of plunger. This is united to the bottom disk $B^1$ by short rods $b^6$, the distance between $B^1$ and $B^2$ being sufficient to allow the balls $b^5$ to open and close the openings $b^4$. The top plate $B^2$ can be provided with holes to form upper seats for the balls when in raised position.

The balls in their operation are guided by the rods $b^6$, which cage said balls, so that they properly retain their places and open and close their respective openings. The water or fluid passing up and through the plunger can reach top of same either through the top holes—which can be provided as stated—or by the passage-way created between the pump-barrel and the top plate $B^2$, which, for this purpose, in diameter is less than the bottom plate or disk of the plunger. C is the plunger-rod.

It is therefore apparent by the above construction of the plunger, that as it is raised the balls are caused to close their openings; and when said plunger descends, said balls are caused to rise to allow the entrance above plunger of the fluid. The lower section $A^2$ I provide with the clack D, the construction of which is identical with that of the plunger—that is, $d$ represents the bottom plate, having holes $d^1$ controlled by balls $d^2$ guided in operation by the short rods $d^3$, to which the upper plate $d^4$ is united, all as shown in Fig. 1. The upper plate of D is also smaller in diameter than the pump-barrel, to allow for the upward entrance or passage of the fluid. The joint of the lower section $A^2$ carrying the clack D with pump-barrel is made as ordinarily. (See Fig. 1.)

Having thus fully described my invention, the operation is therefore as follows: Assume the position of the plunger to be at the beginning of its upward stroke. The balls now rest on the seats of their respective openings. On the upstroke of the piston or plunger the balls in the clack rise and admit the water, owing to a suction being created by the balls in the plunger being closed. Similarly, on the downward stroke of the plunger, the balls in plunger rise and allow the water to rise to the top of the same, the balls in the clack at same time being closed. On the next upstroke the first operation is repeated, together with lifting the water to the top of the plunger up and out of pump-discharge.

What I claim is—

1. The plunger, consisting of the bottom disk $B^1$, having groove $b$, the rings $b^1$, holes $b^4$, balls $b^5$, rods $b^6$, upper disk $B^2$, to operate as and for the purpose set forth.

2. The lift-pump proper, provided with a plunger, B, consisting of the bottom disk $B^1$ having the rings $b^1$, holes $b^2$, guide-rods $b^6$, upper disk $B^2$, the clack-valve D, consisting of the bottom disk $d$ having holes $d^1$, balls $d^2$, rods $d^3$, upper plate $d^4$, and the pump-sections $A^1 A^2$, all said parts being combined to operate in the manner and for the purpose set forth.

In testimony of said invention I have hereunto set my hand.

JOHN LUSTER.

Witnesses:
S. E. SANDERS,
GEO. W. PAYTON.